United States Patent [19]
Kreft

[11] Patent Number: 5,349,393
[45] Date of Patent: Sep. 20, 1994

[54] LIGHT-TRANSMITTING ELASTOMERIC SUCTION LENS

[76] Inventor: James P. Kreft, Rte. 2, Box 65A-2, Tecumseh, Okla. 74873

[21] Appl. No.: 69,395

[22] Filed: Jun. 1, 1993

[51] Int. Cl.⁵ .............................................. G02C 7/06
[52] U.S. Cl. ..................................... 351/57; 351/158; 351/168; 351/172
[58] Field of Search ................. 351/57, 158, 159, 168, 351/172

[56] References Cited

U.S. PATENT DOCUMENTS 3,628,854 12/1971 Jampolsky .......................... 351/175
4,563,065 1/1986 Kreissl .................................. 351/86
5,153,619 10/1992 Nix ....................................... 351/57
5,266,977 11/1993 Linden ................................. 351/57

*Primary Examiner*—Scott J. Sugarman
*Attorney, Agent, or Firm*—Finnegan, Henderson, Farabow, Garrett & Dunner

[57] ABSTRACT

An ophthalmic lens is disclosed for changing the focal point of a light-transmitting element. Formed from a light-transmitting silicone, the lens has a concave surface for creating suction when applied to a smooth surface. An exposed surface opposes the concave surface for providing a specific diopter. The lens quickly and impermanently attaches with finger pressure to a desirable smooth surface such as the lens of eyeglasses.

16 Claims, 1 Drawing Sheet

LIGHT-TRANSMITTING ELASTOMERIC SUCTION LENS

BACKGROUND OF THE INVENTION

The present invention relates to a suction lens and more particularly to a light-transmitting elastomeric suction lens for attachment to a smooth surface of a light-transmitting element such as eyeglasses.

There are many applications for changing lens focal points including, for example, temporary bifocals. The suction lens allows for positioning temporary bifocals anywhere on eyeglasses. Individuals in numerous occupations such as medicine, optics, plumbing, programming, detailed mechanics, and electronics need bifocals in positions other than those typically placed on eyeglasses. Additionally, individuals trying on frames in an optical dispensary may require temporary bifocals to enable them to see themselves. Furthermore, the suction lens attaches to diving masks, work goggles, welding helmets, and sunglasses thus inexpensively and quickly satisfying many vision needs. The suction lens can even attach to a mirror for magnifying purposes during grooming.

In addition to eyeglasses, numerous devices improve the vision process. One method utilizes a monocular or binocular system installed directly into the lenses of eyeglasses or in eyeglass frames themselves. These sophisticated and complicated devices require laboratory technician skill for installation. Rigid fixturing prohibits the wearer from repositioning the devices as circumstances and needs change. Moreover, most individuals find these devices costly and cosmetically unacceptable.

Fresnel lenses improve vision by using mathematically formulated ridges cut into a thin film to obtain magnification while avoiding the thickness normally accompanying a particular curved optics prescription. Plastic thin-film Fresnel lens attach to eyeglasses assisting the treatment of eye disorders using various magnifications, tints, shading, and hole patterns. The thin-film Fresnel lens uses a planar surface to mate against the curved surface of an eyeglass lens.

While, the thin-film Fresnel lens satisfy some needs, it also has problems. Producing Fresnel lens by cutting ridges into the plastic thin-film causes optical imperfection and distortion visible to the wearer. The plastic used to produce the Fresnel ridges does not readily adhere to lenses on a more permanent basis and is susceptable to trapping bubbles between a base lens and itself. The planar surface opposite the ridged surface of the thin-film Fresnel lens does not hold or adhere to all smooth lens surfaces adequately. Specifically, this nonstick phenomena is most apparent when wrapping the planar surface of the plastic thin-film Fresnel lens around the convex surface of a high diopter base lens. While the thin-film Fresnel lens provides a cheap and easy to use add-on lens, shortcomings remain.

SUMMARY OF THE INVENTION

Accordingly, the present invention is directed to a light-transmitting elastomeric suction lens that substantially obviates one or more of the problems due to limitations and disadvantages of the related art.

The principle advantage of the present invention is the improved attachment or adhesion while retaining the benefit of simple curved optics which substantially obviates one or more of the limitations and disadvantages of prior arrangements.

Additional features and advantages of the invention will be set forth in the description which follows, and in part will be apparent from the description, or may be learned by practice of the invention. The objectives and other advantages of the invention will be realized and attained by the light-transmitting elastomeric suction lens particularly pointed out in the written description and claims hereof as well as the appended drawings.

To achieve these and other advantages and in accordance with the purpose of the invention, as embodied and broadly described, the invention includes a lens body formed of a light-transmitting elastomeric material. The lens body has a concave surface having a radius to create suction with a smooth surface. Additionally, the lens body has an exposed surface opposite the contacting surface for creating a predetermined relationship between the contacting surface and the exposed surface for providing a specific diopter.

In another aspect, the invention includes a lens having a predetermined prescription through which light rays transmit to the eye. A lens body is formed of a light-transmitting elastomeric material. The lens body has a contacting concave surface having a radius to create suction for conformably attaching to the lens. Additionally, the lens body has an exposed surface opposite the contacting concave surface. The exposed surface has another radius creating a predetermined relationship between the contacting surface and the exposed surface for providing a specific diopter. The lens body thereby refracts the light rays transmitted through the lens to the eye.

It is to be understood that both the foregoing general description and the following detailed description are exemplary and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate several embodiments of the invention and together with the description serve the principles of the invention.

In the drawings.

DESCRIPTION OF THE PREFERRED EMBODIMENT

The present invention for ophthalmic use includes a lens body through which light rays are transmitted to the eye. The lens body has a contacting concave surface to create suction for conformably attaching the body to a smooth surface. Opposite the concave surface is an exposed surface having a predetermined relationship with the concave surface so that the two surfaces provide for a specific diopter, thereby refracting the light rays transmitted through the lens body.

Reference will now be made in detail to the present preferred embodiments of the invention, examples of which are illustrated in the accompanying drawings.

Figure 1:
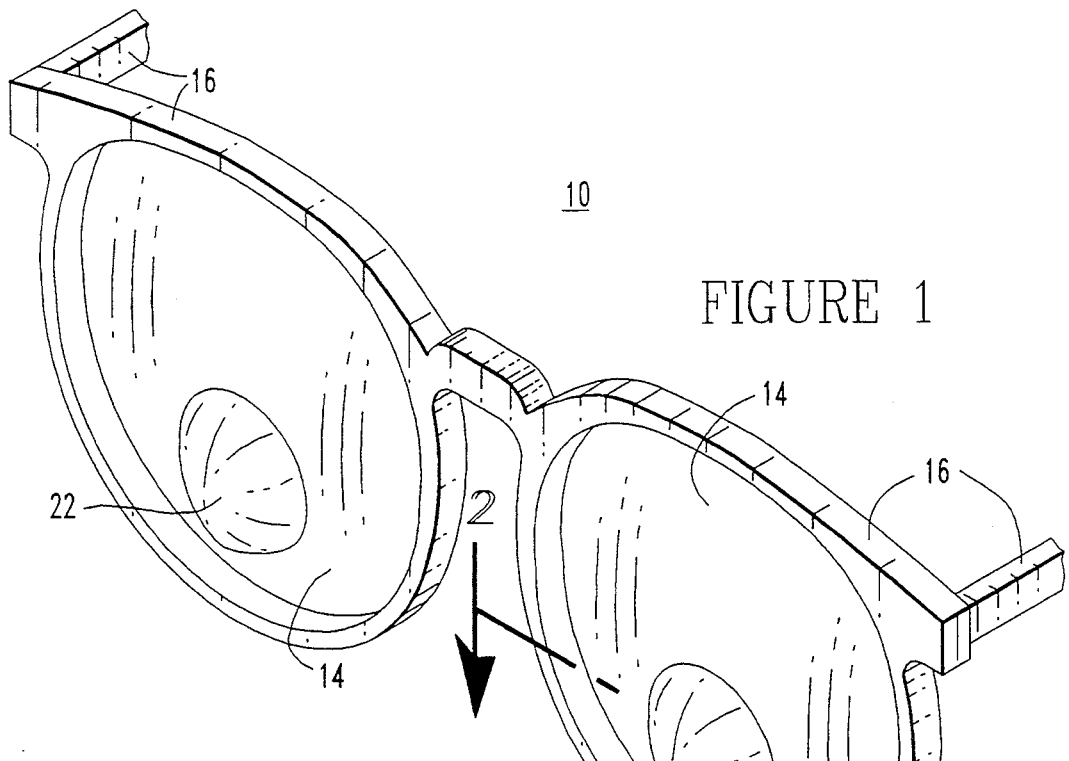
FIG. 1 is a perspective view of a device in which the present invention is embodied.
Figure 2:
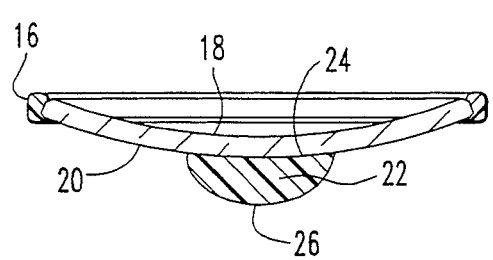
FIG. 2 is a cross-section on line 2—2 of FIG. 1.

The exemplary embodiment of the ophthalmic lens of the present invention is shown in combination with eyeglasses in FIGS. 1 and 2 and is designated generally by reference numeral 10. The eyeglasses 12 include a pair of lenses 14 in a frame 16. The illustrated lenses 14 have a concave surface 18 and a convex surface 20.

A lens body 22, preferably made of a light-transmitting elastomeric material, has a contacting concave surface 24 having a radius or curvature to create suction with a smooth surface. An exposed surface 26 opposes the contacting concave surface 24. A predetermined relationship exists between the surfaces 24, 26 to provide for a specific power or diopter. Simple curved optics formulas apply in determining power.

In curved surface optics, the difference between opposed curved surfaces provides an optical power. A one (1) diopter lens can be derived from many different concave-to-convex surface relationships. For example, the concave surface can be a one (1) diopter surface, while the convex is a two (2) diopter surface. The result is a one (1) diopter lens. An eight (8) diopter concave surface and a nine (9) diopter convex surface also produce a one (1) diopter lens. Therefore, the concave surface curvature of a specific diopter lens body can be chosen to create the suction required for application to a given smooth surface.

The elastomeric material of one embodiment of the lens body 22 is preferably a rubber and more preferably silicone. A suitable material is optically clear and elastomerically capable of developing a suction or vacuum seal with a smooth surface. The material is selected to conform or attach to the smooth surface of a lens or other optical element whether concave, convex, or flat. Molded GERTV615 silicone provides satisfactory results for various lens body 22 diopters due to its optical clarity and elastomeric properties.

Due to the elastomeric nature of the suction lens, a lens body 22 having a contacting concave surface 24 with a smaller radius than that of the targeted smooth surface attaches securely. For example, if a lens body 22 with a six (6) diopter concave surface 24 is placed on a four (4) diopter curvature convex surface 20 of lens 14 in eyeglasses 12, a two (2) diopter air pocket exists between the lens body 22 and convex surface 20 of lens 14. If the lens body 22 is pressed against the convex surface 20, the air pocket disappears as the lens body 22 conforms to the smooth surface. When the pressure is released, the elastic suction lens will try to return to its original form, however, it cannot because of the flexible nature of the material and atmosphere pressures. The material seals with the target surface to prevent the air from returning to the space between the two surfaces, thus creating a vacuum or suction. In pressing the lens body 22 against the lens 14, the curvatures of the contacting and exposed surfaces 24, 26 of the lens body 22 change. However, the material maintains the difference between the two curvatures of the lens body 22, thereby retaining the specific diopter.

The contacting concave surface 24 of the lens body 22 in one preferred embodiment has a radius of 53.0 mm corresponding to a ten (10) diopter base curvature. The ten (10) diopter curvature of a contacting surface 24 enables the lens body 22 to attach by suction on most eyeglass lenses. The typical convex surface of eyeglass lenses is 88.0 mm radius or six (6) diopter. A ten (10) diopter concave curvature on the contacting surface 24 of the lens body 22 ensures suction for convex surfaces of base ten (10) diopter or less and virtually all flat or concave surfaces. However, the lens body 22 contacting concave surface 24 can be adjusted to any necessary curvature to provide suction with a targeted smooth surface.

The exposed surface 26 of the lens body 22 opposite from the contacting surface 24 creates a predetermined relationship with the contacting surface 24 to provide a specified diopter between the two surfaces. The exposed surface 26 is preferably a convex surface having a predetermined relationship to provide a magnifier with contacting surface 24. Additionally, a preferred relationship between the exposed surface 26 and the contacting surface 24 when producing a magnifier provides thin edges on the lens body 22. While the preferred exposed surface 26 provides a magnifier, it is contemplated as well within the scope of the present invention that the exposed surface can be concave or flat, as in planar, providing for a minifier. Additionally, the exposed surface 26 may include multicurve for two or more focuses, aspheric to diminish distortion, or variable curve having progressive power of changing focus.

In accordance with the invention, when the power of the attachable lens results in excessive edge thickness, the area of suction retention may be increased by providing the lens body with a peripheral skirt.

Figure 3:
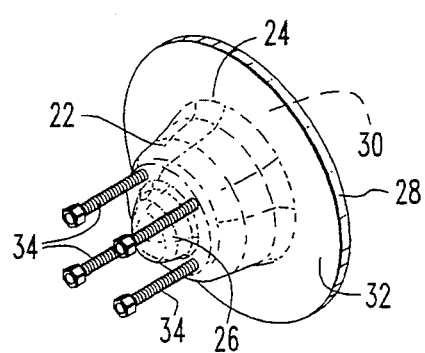
FIG. 3 is a perspective view of another preferred embodiment having a peripheral skirt and arrangement for adding additional lens.

In an alternative embodiment shown in FIG. 3, a peripheral skirt 28 is provided which includes a contacting surface 30 and a top surface 32 opposite the contacting surface 30. The peripheral skirt 28 extends beyond the magnifying or minifying portion of the lens body 22 to provide additional attaching area to provide a larger suction force. The contacting surface 30 of the skirt 28 is preferably an extension of the contacting surface 24 of the lens body 22. The curvature of concave surface 30 and top surface 32 of the peripheral skirt 28 is preferably the same, thereby providing a zero (0) diopter power. In essence, the peripheral skirt 28 does not affect the wearer's sight.

The lens body 22 may also include a device 34 for changing focal point, also illustrated in FIG. 3. The preferred device 34 for changing focal point includes a mounting arrangement 34 for adding a lens near the exposed surface 26 of the lens body 22. The mounting arrangement or device 34 preferably includes bolts for adding additional lenses. Additionally, a sliding or threaded cylinder or other mechanism can function as a focusing device in conjunction with the lens body 22.

Under certain circumstances, an individual may only need temporary relief from eyestrain, and as such, the suction lens may be attached by the wearer for limited periods and thereafter removed or moved to a different pair of glasses so that the wearer only requires a single pair of eyeglasses. The lens body 22 is reusable by washing with soapy water, rinsing, and drying with a lint-free towel. An untrained wearer applies the lens body 22 with simple, ordinary finger pressure making bubble-free contact and impermanently attaching lens body 22 to lens 14.

The lens body 22 can be applied to another lens that either has a prescription or power or is simply a planar surface such as a mirror, a pane of glass, or plastic. When applied to eyeglasses, either the concave or convex surfaces are acceptable. Typically, the concave or inner surface of the eyeglass lenses is preferable for cosmetic purposes when the lens body 22 thickness permits such an application.

While there has been illustrated and described what are at present considered to be preferred embodiments of the present invention, it will be understood by those skilled in the art that various changes and modifications may be made, and equivalents may be substituted for elements thereof without departing from the true scope of the invention. Therefore, it is intended that this invention not be limited to the particular embodiments disclosed herein, but that the invention include all embodiments falling within the scope of the appended claims.

I claim:

1. An ophthalmic lens for attachment to a smooth surface comprising:
   a lens body formed of a light-transmitting elastomeric material;
   said lens body having a contacting concave surface for contacting the smooth surface to create suction with the smooth surface; and
   said lens body having an exposed surface opposite said contacting surface for creating a predetermined relationship with said contacting surface and said exposed surface for providing a specific diopter.

2. The lens of claim 1 wherein said light-emitting elastomeric material is a rubber.

3. The lens of claim 2 wherein said rubber is a silicone.

4. The lens of claim 1 wherein said exposed surface is a convex surface.

5. The lens of claim 4 wherein said predetermined relationship provides a magnifier.

6. The lens of claim 1 wherein said contacting surface includes a peripheral skirt for additional adhesion.

7. An ophthalmic lens for attachment to a smooth surface comprising:
   a lens body formed of a light-transmitting elastomeric material;
   said lens body having a contacting concave surface for contacting the smooth surface, said contacting surface having a radius to create suction with the smooth surface; and
   said lens body having an exposed surface opposite said contacting surface having another radius for creating a predetermined relationship with said contacting surface and said exposed surface for providing a specific diopter.

8. A device for ophthalmic use comprising in combination:
   a lens having a predetermined prescription through which light rays transmit to the eye; and
   a lens body formed of a light-transmitting elastomeric material;
   said lens body having a contacting concave surface for contacting the smooth surface, said contacting surface having a radius to create suction for conformably attaching to said lens; and
   said lens body having an exposed surface opposite said contacting concave surface, said exposed surface having another radius for creating a predetermined relationship with said contacting surface and said exposed surface for providing a specific diopter, thereby refracting the light rays transmitted through said lens to the eye.

9. The device of claim 8 wherein said light-transmitting elastomeric material is a rubber.

10. The device of claim 9 wherein said rubber is a silicon.

11. The device of claim 8 wherein said exposed surface is a convex surface.

12. The device of claim 11 wherein said predetermined relationship provides a magnifier.

13. The device of claim 8 wherein said contacting surface includes a peripheral skirt for additional adhesion.

14. The device of claim 13 further comprising a means for changing focal point of said lens body.

15. The device of claim 14 wherein changing means include a mounting device for adding a lens near said exposed surface of said lens body.

16. The device of claim 15 wherein said mounting device includes bolts.

* * * * *